No. 673,706. Patented May 7, 1901.
W. C. DICKERSON.
CAMERA SHUTTER.
(Application filed Dec. 26, 1900.)

(No Model.) 3 Sheets—Sheet 1.

Witnesses
Frank G. Campbell
C. W. Fowler

Warren C. Dickerson Inventor
by P. Walter Fowler
his Attorney

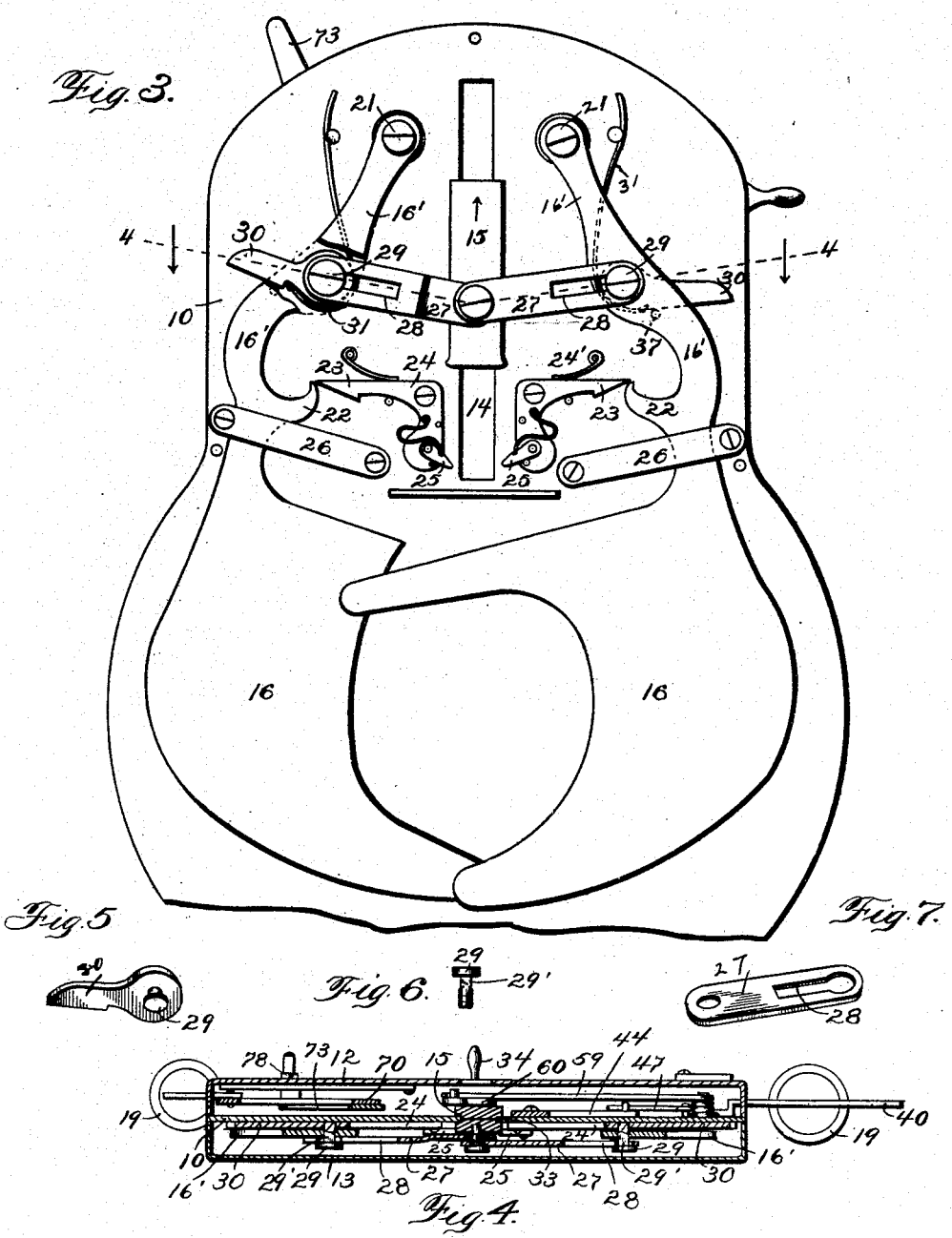

No. 673,706. Patented May 7, 1901.
W. C. DICKERSON.
CAMERA SHUTTER.
(Application filed Dec. 26, 1900.)

(No Model.) 3 Sheets—Sheet 3.

Witnesses
Fenton S Belt,
Howell Battle

Inventor
Warren C. Dickerson
By
T. Walter Fowler
His Attorney

THE NORRIS PETERS CO., PHOTO-LITHO., WASHINGTON, D. C.

UNITED STATES PATENT OFFICE.

WARREN C. DICKERSON, OF NEW YORK, N. Y.

CAMERA-SHUTTER.

SPECIFICATION forming part of Letters Patent No. 673,706, dated May 7, 1901.

Application filed December 26, 1900. Serial No. 41,076. (No model.)

*To all whom it may concern:*

Be it known that I, WARREN C. DICKERSON, a citizen of the United States, residing at New York, in the borough of Bronx and State of New York, have invented new and useful Improvements in Camera-Shutters, of which the following is a specification.

My invention relates to certain new and useful improvements in shutters for use in cameras and wherein are obtained the most desirable results—such, for instance, as a speed equal to most approved "quick-action" shutters in use, the closing of the shutter and holding it closed, and permitting of setting the shutter for either instantaneous or time exposure without disturbing or opening the shutter.

My invention includes the parts and the constructions and combinations of parts hereinafter described, and pointed out in the claims.

Figure 1:
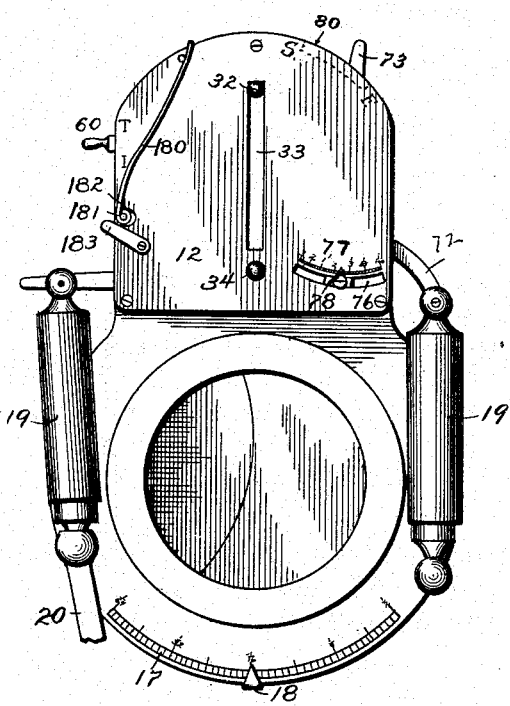
Figure 2:
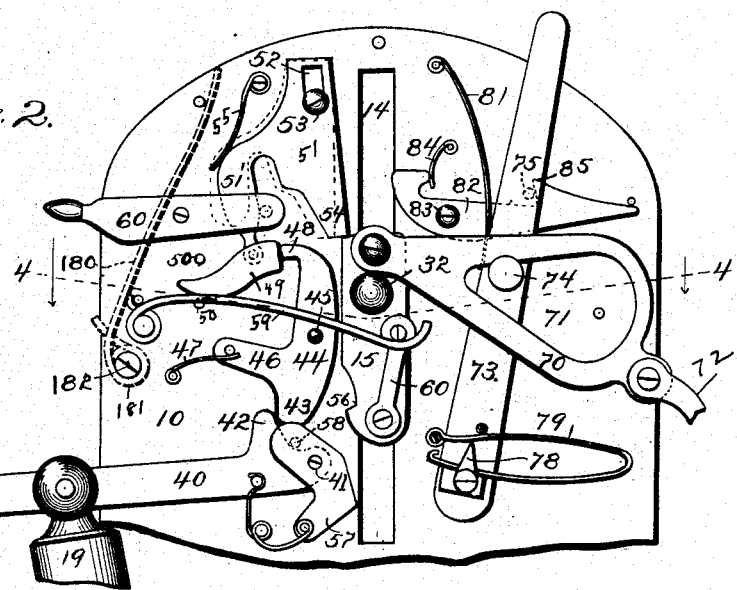
Figure 8:
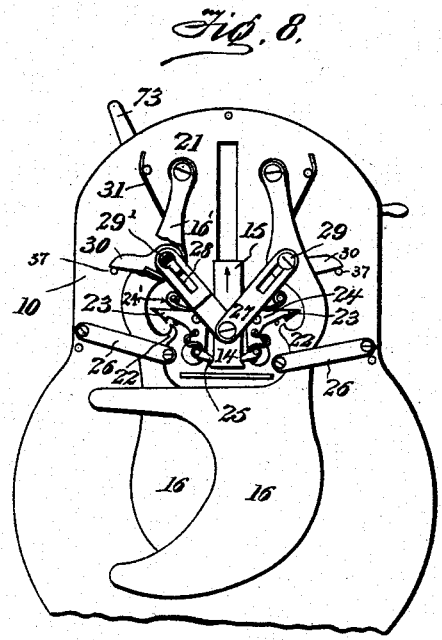
Figure 9:
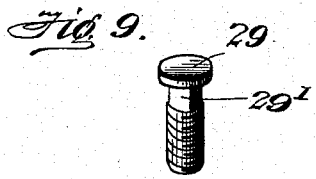
Figure 10:
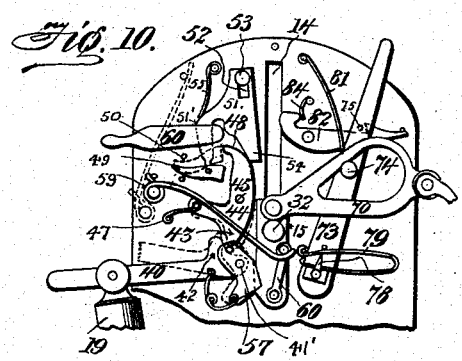

In the accompanying drawings, Figure 1 is a front elevation of a camera-shutter embodying my invention. Fig. 2 is an enlarged elevation of the upper front portion of the shutter, showing the covering-plate removed and with the slide held in a middle position in its slot or guide. Fig. 3 is a similar view showing the rear portion of the shutter with the covering-plate removed. Fig. 4 is a horizontal sectional view on the line 4 4 of Figs. 2 and 3. Figs. 5, 6, and 7 are details to be referred to. Fig. 8 is a view similar to Fig. 3 and showing shutter closed and set ready for opening. Fig. 9 is a view similar to Fig. 2, showing the position of the parts when the shutter is closed and set.

In the preferred construction of my shutter I employ a framework which includes a vertical central plate 10 and front and rear caps or cover-plates 12 13, which are removably secured by screws or otherwise to afford ready access to the inclosed operating parts, the said central plate furnishing the means for supporting the several mechanisms or mechanical instrumentalities for the operating parts of the shutter. The plate 10 is formed or provided with a centrally-located guide, which is herein shown as in the form of a slot 14, the end walls of which determine the extent of movement of the slide or block 15, which controls and imparts movement to the several features hereinafter recited.

The shutter members 16 are disposed upon one side of the plate 10 and control the exposure-opening in the usual manner, and they are used with any form of lens, diaphragm, and adjunctive parts, which constitute essential parts of a complete photographic camera. These features are not shown, as they constitute no part of my present invention, although in Fig. 1 I illustrate a scale at 17, over which a pointer 18 is movable for adjusting the usual diaphragm in the well-known manner. To the front of the shutter-frame is also secured the pistons and cylinders, shown generally at 19 and operated by air-pressure introduced through the usual tube and bulb, a portion of the tube being shown at 20 in Fig. 1.

The lower portions of the shutter members do not depart materially from those usually employed; but the upper portions are cut away or greatly reduced to form comparatively narrow extensions 16', the upper extremities of which are pivotally held by screws or otherwise at 21, while another portion of said extensions is formed with latches, as 22, adapted to engage with catches 23, formed as members of bell-crank levers 24, which are spring-pressed, as at 24', and pivoted at their angles to the plate 10, one of these levers being upon each side of the central guide or slot in said plate, and each of said bell-crank levers having its lower portion provided with a pivoted spring-pressed pawl 25 or equivalent part, adapted for engagement with the slide or block 15, as I will hereinafter indicate, which block, it will be understood, extends through the slot, so that the operating devices upon each side of the plate may be given motion by the slide in the opening and closing actions of the shutters. The shutter members are also guided in their movement and maintained closely together sidewise by the loops or guides 26.

The shutter members are connected with the slide or block 15 by means of links 27, whose outer ends are longitudinally slotted at 28 and secured to the shutter members by studs 29, fixed (say by screwing) in blocks 30, located between the said shutter members and the plate 10 and acted upon by springs 31, as shown in Fig. 3.

As shown in the detail Figs. 5, 6, and 7, the outer end of the slot 28 is substantially round, and from this circular opening the slot is contracted and leads inwardly, and the pin or stud 29 is formed with flat faces at 29', which enables the stud to travel in the contracted portion of the slot without danger of the shutter being opened in the act of setting it. On the slide is a stud or pin 32, which projects through a central slot 33 in the front plate or cap of the shutter-frame before alluded to, a second stud 34 or other projection being fixed to the cap or cover-plate 12, as shown in Fig. 1. Referring now to Fig. 3, it will be apparent that when the fingers grasp the studs or pins 32 34, Fig. 1, and pressure is brought upon the stud 32 the slide or block 15 is forced downward, carrying with it the links 27.

In Fig. 3 the position of the parts indicate the slide as ready to move upward and the shutter is open; but it will be understood that in the first or downward movement of the slide from the upper limits of the slot 33 the slotted links are straightened out in the manner of the well-known toggle-lever and the flat-faced portions of the studs 29 are in line with the reduced portions of the slots 28, so that the links 27 may first slide freely on the studs.

In the downward movement of the slide and as the links straighten out they turn the studs 29 and their blocks 30 until just before the complete downward movement of the slide 15 the springs return the blocks and turn the studs until the flat-faced portion of the studs will stand crosswise the circular portion of the slots, which prevents these studs again entering the slots until this position of parts is altered, as when the slide has returned to its normal position.

It will be understood that in the described position of parts the parts 22 and 24 are directly engaged, and as the lower portion of the slide 15 strikes the pawls 25 the levers 24 are rocked and their engagement broken with the shutter members, only to be reëngaged by the slide completing its return movement. Owing to the studs being prevented from again entering the slots, the links cannot now move without opening the shutter, and the shutter-sections cannot open until the operating devices on the opposite side of the shutter are set in motion. When the latter are operated, as I will presently describe, the links force the shutter-sections apart to permit the necessary exposure. On the opposite or front side of the shutter-frame plate 10 is disposed the mechanism which is actuated to release the shutter.

As shown in Fig. 2, the air-piston 19 has a pivotal connection with a lever 40, fulcrumed at 41 to the plate 10 and having a toe-piece 42, which engages an arm 43 of a lever 44, fulcrumed at 45 and having an arm 46 with a pin, against which a spring 47 bears. This lever 44 also has a lug or toe-piece 48 at its upper end, which is adapted to engage a horizontally-sliding piece 49, guided between pins 50 or equivalent means and pivotally suspended from an arm of a vertical plate 51, having a slot 52 engaging a fixed pin 53, whereby said plate is slidably mounted. This plate 51 has a shoulder or portion 54, which is adapted to pass over the top edge of the slide or block 15 and lie in the path thereof, so as to form a check for the block on its upward movement, said sliding plate 51 being acted on by a spring 55, which tends to swing the plate inward, so that when the top edge of the block or slide 15 passes the shoulder or portion 54 the spring 55 projects this shoulder into the path of the slide 15 to check the latter on its upward movement, thereby leaving the shutter open for time exposure.

As shown in Fig. 2, the slide or block 15 is notched at 56, and this notched portion is engaged by a spring-pressed pawl 57, fulcrumed upon the axis 41 of the lever 40 and adapted to secure the slide or block in a locked position with the shutter closed, said lever 57 having a pin or stud 58, which is engaged by the toe portion 42 of the lever 40 to release the pawl 57 from the notch 56 when the lever 40 is actuated either by hand or by air appliances such as shown, and immediately on the release of the slide or block 15 its spring 59 and link 60 cause the block to be quickly elevated until its progress is checked by the shoulder or portion 54 of the sliding plate 51, the first contact of the slide or block 15 with the plate 51, which is then in its lowered position, resulting in the latter moving upwardly, because of its pin-and-slot connection, thereby elevating the sliding piece 49 until it is brought into line with the toe-piece 48 of the lever 44, when the next air impulse or movement of the lever 40 and other parts necessary to close the shutter after exposure causes the lever 44 to press upon the sliding piece 49, and consequently move the sliding plate 51 until its shoulder 54 is moved out of contact with the top edge of the slide or block, thereby enabling the latter to complete its movement.

Not wishing to take a time picture, a lever 60, fulcrumed to the plate 10 and having an operating finger-piece, is operated so that its inner end rides against the arm 51' of the plate 51 and swings the latter outwardly, so that its shoulder 54 is held to one side of the line of travel of the slide or block, thereby enabling the latter to make a complete movement from one end of the slot or guide to the other. Thus the lever 60 serves a very useful purpose in connection with the other described features in that it permits the full travel of the slide within the limits of its slot or guide and at such speed as the operator may have set the shutter.

In addition to the foregoing features my improved shutter is provided with means for fixing the speed of the slide as the operator may determine. These means are illustrated in Figs. 1 and 2, and consist of a plate 70, pivoted to the upper portion of the slide or block 15 and provided with a slot 71, the walls of which diverge from the inner toward the outer end, said outer end having a pivotal connection with a plate or bar 72, carried by the piston 19 of the air-cylinder on that side of the shutter. A vertically-disposed lever 73 behind the plate 70 carries a stud 74, which engages with the walls of the divergent slot or opening 71, said lever having a pin or stud 75 on one of its faces, while the lower end of said lever 73 has a lug working in a slot 76 in the front cover-plate 12, struck from the pin or stud 75 as a center, an appropriate scale 77 being marked adjacent to the slot and over which works a pointer 78 on the lower end of the lever 73, said lever being maintained within the slot with sufficient friction to operatively hold it by means of a spring 79 and the upper end of the lever extending through a slot 80 in the top of the cover-plate and being normally pressed outwardly by means of a spring 81, as shown in Fig. 2. Between the lever 73 and the plate 10 is a horizontally-disposed lever 82, fulcrumed at 83, having its short arm acted upon by a spring 84 and its long arm provided with a catch 85, which engages with the lug or pin 75. The inner or short arm of the lever 82, when the parts are in the position shown in Fig. 2, projects slightly within the path of movement of the slide or block 15, and when the latter in ascending strikes this short arm of the lever 82 the said lever is rocked about its fulcrum until the latch 85 disengages with the lug or pin 75, when the spring 81 forces the lever 73 to one side and out of the way to enable the shutter to then close instantaneously.

The adjustment of the lever 76, as by setting its pointer to the desired gradation on the scale, fixes the speed of closing the shutter members. When the lower or pointer end of the lever 73 is moved, say, to the right, the stud 74 rides under the upper inclined wall of the slot or opening 71, and thus pushes the outer end of the plate 70 upwardly and correspondingly elevates the piston 19 on its cylinder and disposes the stud 74 in the wider portion of the slot or opening 71, so that when the slide is released from its set position it travels at full speed until the lower wall of the opening 71 strikes the stud 74 from below, and thus becomes the fulcrum about which the plate 70 turns, and the outer end of the plate 70 being connected with the air-cushion in the cylinder 19 the latter resists the movement of the plate 70 and now retards the movement of the slide and the closing of the shutter.

If extra speed is desired the shutter members, I provide for this by an extra spring 180, which when not in use is held upon the exterior of the cover-plate 12, but when desired for use has its coiled end 181 placed over a stud 182, Fig. 2, exposed through a slot covered by a pivoted plate or closure 183, Fig. 1, and its free end bent into engagement with the stud or pin 32 on the slide or block 15.

While I have illustrated and described a very practical and useful construction of parts for carrying out the novel functions of my device, I do not limit myself to the precise details, as these may be modified within reasonable limits without materially altering the scope of the invention or impairing the results.

Having thus described my invention, what I claim as new, and desire to secure by Letters Patent, is—

1. In a photographic shutter, the combination of a shutter, a latching mechanism for holding the shutter normally closed, a reciprocating mechanism for tripping the latching mechanism in one direction of the movement of said reciprocating mechanism, and thereby setting the shutter in operative position, means for holding the reciprocating mechanism at the completion of said movement, and means for opening the shutter by the return movement of the reciprocating mechanism.

2. In a photographic shutter, the combination of movable normally-locked shutter members, a slide adapted to unlock the shutter members and set the shutter ready for exposure, without exposing the light-opening, means engaging and holding the slide at the completion of its movement, and connections between the slide and shutter members for opening the latter by the return movement of the slide.

3. In a photographic shutter, the combination of pivoted shutter members, locking devices for holding the members normally closed, a slide and connections therefrom to each shutter member said slide traveling in the path of and releasing the locking devices from connection with the shutter members whereby the shutter is set in operative position, means for holding the slide at the completion of its movement in one direction, and means for releasing the slide, said connections having a movement independent of the shutter members in one direction of movement and a movement in unison with the shutters during the return movement.

4. In a photographic shutter, the combination of movable shutter members, a slide, slotted link connections between the slide and shutter members, a latching mechanism for holding the shutter members normally closed said mechanism disposed in the path of and actuated by the slide to unlatch the shutter members and said link connections then holding the shutter in a set position, and means whereby the link connections open the shutter on the return movement of the slide.

5. In a photographic shutter, the movable shutter members and means whereby they are normally latched and held in a closed condition, in combination with a slide, connections between the slide and the shutter members, means whereby the slide and its connections may release the latching devices and thereby set the shutter while the latter remains closed, latching devices for holding the slide in operative position, and a trip mechanism for releasing the latching devices and simultaneously permitting the opening of the shutter.

6. In a shutter, the combination of movable shutter members, a slide, slotted-link connections between the slide and shutter members, means permitting the links to slide freely on the shutter members without imparting movement to the latter, in one direction of movement of the slide, and locking the links to the shutter members on the return movement of the slide, and engaging and releasing devices for the slide.

7. In a shutter and in combination with the movable members thereof, means for latching the shutter against opening, a slide mechanism and a slotted-link connection between the same and the shutter members whereby the slide may be moved independent of the shutter to set the latter, said shutter-latching devices disposed in the path of the slide and actuated by the latter to unlatch the shutter, means for holding the slide in a set position and means for releasing the slide to enable it to open the shutter.

8. In a shutter and in combination with the movable members thereof, means for latching said members against opening, a slide mechanism for tripping the shutter-latching devices and placing the shutter in operative position for exposure, and means for locking the slide in a set position, means connecting the slide with the shutter members and means for releasing the slide to allow it to open the shutter.

9. In a shutter and in combination with the movable members thereof, devices for latching the said members against opening, a slide mechanism movable in the path of and adapted to trip the shutter-latching devices, means for locking the slide mechanism against return movement, a link mechanism between the slide and shutter members and means for releasing the slide mechanism whereby the link mechanism first opens the shutters and then closes them into engagement with the shutter-latching devices.

10. In a shutter and in combination with the movable members thereof, provided with latches, spring-pressed levers adapted to engage said latches and hold the shutter closed during the setting operation, a slide movable in the path of and adapted to trip said levers and thereby release the shutter members from their locked position, a link connection between the slide and the shutter members, means for holding the slide in its operative position and means for releasing the slide to enable the links to first open the shutter and then close it, and again latch the members thereof.

11. In a shutter, and in combination with the movable members thereof, provided with latches, the bell-crank levers each having one arm provided with a catch to engage the latch of the companion shutter member, to hold the member closed, and having a second arm provided with a spring-pressed pawl, a slide movable in the path of the pawl and adapted to engage the same and trip the bell-crank levers to release the shutter-latches, oppositely-extending links connecting the shutter members with the slide, means for holding the slide set in operative position and means for releasing the slide.

12. A photographic shutter comprising movable shutter members, a slide mechanism, a substantially toggle-lever connection between the slide and shutter members, shutter-latching mechanism in the path of movement of the slide, means for holding the slide in a set or operative position, and means for releasing the slide, said toggle-lever connection having a slotted connection with the shutter members whereby the slide is moved into operative position without opening the shutter and releases the shutter from its latching devices, and upon the release of the slide the lever connection first opens the shutter and then closes it and moves the members thereof into another engagement with the latching devices.

13. In a photographic shutter, the movable members thereof; latching devices for holding them closed during the setting of the shutter; a slide; links pivoted to the slide and extending therefrom to each shutter member, said links having in their outer ends slots of two diameters; turnable pins carried by the shutter members and having flattened portions slidable with relation to the narrower portions of the slots in the links whereby the slide moves in one direction without moving the shutter and the flattened portions of the pins enter the enlarged portion of the slots in the links; means for turning the pins so that they are prevented from again entering the narrow portions of the slots, and the shutter is directly connected with the slide, said slide automatically releasing the shutter-latching devices; means for holding the slide in operative position, and means for releasing the slide to enable it to first open and then again close and latch the shutter.

14. In a photographic shutter the combination of a shutter and means normally latching the same, a reciprocating slide, connections between the same and the shutter, for opening the latter, and means actuated by the slide for unlatching the shutter, said slide having a notch, a pawl adapted to engage said notch and hold the slide depressed and in an operative position, and means for withdrawing the pawl and thereby releasing the slide.

15. In a photographic shutter, the combination of a shutter, means for maintaining the shutter closed during its setting operation, a reciprocating slide, devices actuated thereby during one movement of the slide to release the shutter without allowing it to open, means actuated by the slide for opening the shutter during a return movement of said slide, and a latching device engaging the slide in its first movement and holding it locked with the shutter ready for exposure, and said actuating device adapted to release the slide to permit it to make its return movement.

16. The combination with a shutter and means for normally holding it against opening, a reciprocating spring-pressed slide and means actuated thereby for releasing the shutter, means for locking the slide and holding the shutter against opening when thus released whereby the shutter may be set without opening, and means for releasing the slide to enable it to open the shutter.

17. The combination with a shutter and means for normally holding it against opening, a reciprocating spring-pressed slide and means actuated thereby for releasing the shutter, means for locking the slide and holding the shutter against opening when thus released whereby the shutter may be set without opening, means for releasing the slide to allow it to open the shutter, a check in the path of the return movement of the slide for momentarily stopping its return, while the shutter is open, and means for withdrawing the check to allow the slide to complete its return movement and close the shutter.

18. The combination of a shutter, a reciprocating spring-pressed slide and means for locking the slide at the completion of one movement, means for releasing the slide and means for opening the shutter by the return of said slide, and a check comprising a pivoted spring-pressed plate adapted to be projected into the path of the slide to temporarily retard the latter while the shutter is open, for time exposures, and means withdrawing the check to enable the slide to complete its return and close the shutter.

19. The combination of a shutter, a reciprocating spring-pressed slide, means for locking the slide substantially at the completion of one movement, means for releasing the slide, means for opening the shutter by the return movement of the slide, a check movably secured and means whereby it may be moved into the path of the slide to temporarily retard the same while the shutter is open, for time exposures, and means for holding the check out of the path of the slide for instantaneous work.

20. The combination of a vertically-reciprocating slide, a shutter and connections between the slide and shutter, for opening the latter by the former, slide-holding and slide-releasing devices, and a vertically-movable plate pivotally secured so that it may be projected laterally into the path of movement of the slide or held out of said path.

21. The combination of a vertically-reciprocating slide, a shutter and connections between it and the slide, slide-holding and slide-releasing devices, and a vertically-movable plate pivotally secured, having a portion to be projected laterally into the path of movement of the slide and means whereby the plate may be set for either time or instantaneous work.

22. The combination of a reciprocating slide, a shutter and connections between it and the slide, slide-holding and slide-releasing devices, means for checking the return movement of the slide or permitting it to make a full return movement, including a piece movable into and out of the path of movement of the slide, a speed-indicator and devices connected with the slide for regulating the speed of its travel while the shutter is open.

23. The combination of a reciprocating slide, a shutter and connections between it and the shutter, slide-holding and slide-releasing devices and a speed mechanism for the slide including a plate having a diverging opening, a lever having a stud to operate within said opening, means whereby the lever may be adjusted so that its stud may be set at different positions in the opening, and speed-indicating devices.

24. The combination of a reciprocating slide, a shutter and connections between it and the shutter, slide-holding and slide-releasing devices, and a speed mechanism for the slide including a plate having a diverging opening, a spring-pressed lever having a stud to operate within said opening, means whereby the lever may be adjusted so that its stud may occupy different positions in the opening, and speed-indicating devices, a spring-pressed fulcrumed lever having an arm in the path of the slide so as to be actuated thereby, said fulcrumed lever having a catch to engage a pin on the first-named lever and to release said pin when the second-named lever is tripped by the slide.

25. The combination of a shutter, a reciprocating slide, a slotted plate serving as a guide for the slide, shutter-actuating devices on one side of the plate, and connected with the slide, said slide having a notch, slide-operating devices on the opposite side of said plate and including a fulcrumed lever having a toepiece, a pawl pivoted to said lever and adapted to engage the notch in the slide, for holding said slide in an operative position, a second fulcrumed lever, spring-pressed and having a toepiece and a portion engaged by the toepiece of the first-named lever, a vertical plate movable into and out of the path of the slide, and having also a vertical movement, and a substantially horizontal member pivotally hung from the plate and normally held out of line with the toepiece of the second-named lever, said vertical plate adapted to be moved vertically by the slide to bring its horizontal member in line with the toepiece of the second-named lever whereby a succeeding movement of the said lever withdraws the plate out of the path of the slide.

26. In a shutter, the combination of a slotted guide, a vertical slide, slide-engaging devices, a shutter and mechanism for actuating the same, and means for moving the slide into a set position consisting of a pin on the slide and a second pin on a fixed part of the shutter-casing.

In testimony whereof I have hereunto set my hand in presence of two subscribing witnesses.

WARREN C. DICKERSON.

Witnesses:
T. W. FOWLER,
CHAPMAN W. FOWLER.